(12) United States Patent
Rajeev

(10) Patent No.: US 9,963,232 B2
(45) Date of Patent: May 8, 2018

(54) AIRCRAFT FLOOR PANEL WITH BALL TRANSFER UNIT

(71) Applicant: MITSUBISHI AIRCRAFT CORPORATION, Aichi (JP)

(72) Inventor: Bachhao Rajeev, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 97 days.

(21) Appl. No.: 15/005,720

(22) Filed: Jan. 25, 2016

(65) Prior Publication Data

US 2016/0214718 A1    Jul. 28, 2016

(30) Foreign Application Priority Data

Jan. 26, 2015  (JP) ................................ 2015-011957

(51) Int. Cl.
*B64C 1/20* (2006.01)
*B64D 9/00* (2006.01)
*B65G 39/02* (2006.01)

(52) U.S. Cl.
CPC .................. *B64D 9/00* (2013.01); *B64C 1/20* (2013.01); *B64D 2009/006* (2013.01); *B65G 39/025* (2013.01)

(58) Field of Classification Search
CPC .... B64C 1/18; B64C 1/20; B64D 9/00; B64D 2009/006; B65G 39/00; B65G 39/02; B65G 39/025; B65G 7/04; B60P 1/52; B60B 33/08; B60B 33/0028
See application file for complete search history.

(56) References Cited

U.S. PATENT DOCUMENTS

| 4,285,550 | A | * | 8/1981 | Blackburn | ........... | B65G 39/025 |
| | | | | | | 16/25 |
| 4,382,637 | A | * | 5/1983 | Blackburn | ........... | B65G 39/025 |
| | | | | | | 16/25 |
| 4,399,642 | A | * | 8/1983 | Bard | ......................... | B64C 1/18 |
| | | | | | | 52/483.1 |
| 4,577,450 | A | * | 3/1986 | Large | ....................... | B64C 1/18 |
| | | | | | | 411/369 |
| 5,076,412 | A | * | 12/1991 | Huber | .................... | B65G 13/10 |
| | | | | | | 193/35 MD |
| 5,390,775 | A | * | 2/1995 | Herrick | ..................... | B64C 1/20 |
| | | | | | | 193/35 MD |

(Continued)

FOREIGN PATENT DOCUMENTS

| EP | 1 640 295 A1 | 3/2006 |
| EP | 2441 668 A2 | 4/2012 |
| GB | 2 377 206 A | 1/2003 |

OTHER PUBLICATIONS

European Search Report for Application No. 15202570.6-1754 dated Mar. 15, 2016.

*Primary Examiner* — Richard R Green
*Assistant Examiner* — Michael A. Fabula
(74) *Attorney, Agent, or Firm* — Pearne & Gordon LLP

(57) ABSTRACT

A floor panel apparatus comprises: beams arranged inside an aircraft main body; floor panels arranged on the beams; and ball transfer unit bolts each including a ball transfer unit in which a rotatable ball is disposed and a bolt portion which is integral with the ball transfer unit, the ball transfer unit bolts configured such that the floor panels and the beams are detachably fastened together by the bolt portions with the balls protruding on the floor panel side.

5 Claims, 5 Drawing Sheets

(56) References Cited

U.S. PATENT DOCUMENTS

| | | | |
|---|---|---|---|
| 5,538,346 A | 7/1996 | Frias et al. | |
| 5,673,780 A * | 10/1997 | Bildsoe | B65G 13/10 108/55.3 |
| 5,752,673 A | 5/1998 | Schliwa et al. | |
| 5,876,024 A * | 3/1999 | Hain | B64C 1/18 244/119 |
| 6,129,195 A * | 10/2000 | Matheny | B65G 39/025 193/35 A |
| 6,814,212 B1 * | 11/2004 | Ebersole | B65G 13/11 193/35 MD |
| 7,007,786 B2 * | 3/2006 | Huber | B64C 1/20 193/35 MD |
| 7,370,746 B2 * | 5/2008 | Iguchi | B65G 39/025 193/35 MD |
| 7,556,472 B2 * | 7/2009 | Arneson | B65G 39/025 193/35 SS |
| 8,177,466 B2 * | 5/2012 | Csik | F16B 37/043 411/174 |
| 8,529,131 B2 * | 9/2013 | Deng | F16C 29/046 193/35 MD |
| 8,709,584 B2 * | 4/2014 | Carstensen | B64D 9/003 244/133 |
| 9,033,632 B2 * | 5/2015 | Komsitsky | F16B 5/0208 411/182 |
| 9,238,551 B2 * | 1/2016 | Kalitta | B64D 9/00 |
| 2005/0126879 A1 * | 6/2005 | Olson | B64D 9/00 193/35 MD |
| 2006/0065786 A1 | 3/2006 | Huber et al. | |
| 2006/0243861 A1 * | 11/2006 | Krueger | B64D 9/00 244/137.1 |
| 2007/0193146 A1 * | 8/2007 | Carstensen | B64D 9/003 52/268 |
| 2007/0246325 A1 * | 10/2007 | Arneson | B65G 39/025 193/35 C |
| 2008/0203226 A1 * | 8/2008 | Greenwood | B64D 9/00 244/118.1 |
| 2010/0054889 A1 * | 3/2010 | Stegmiller | B64D 9/00 410/92 |
| 2013/0014376 A1 * | 1/2013 | Komsitsky | F16B 5/0208 29/525.02 |
| 2014/0326574 A1 * | 11/2014 | Kalitta | B65G 39/12 193/35 MD |
| 2015/0307284 A1 * | 10/2015 | Stegmiller | B65G 13/00 193/35 MD |

* cited by examiner

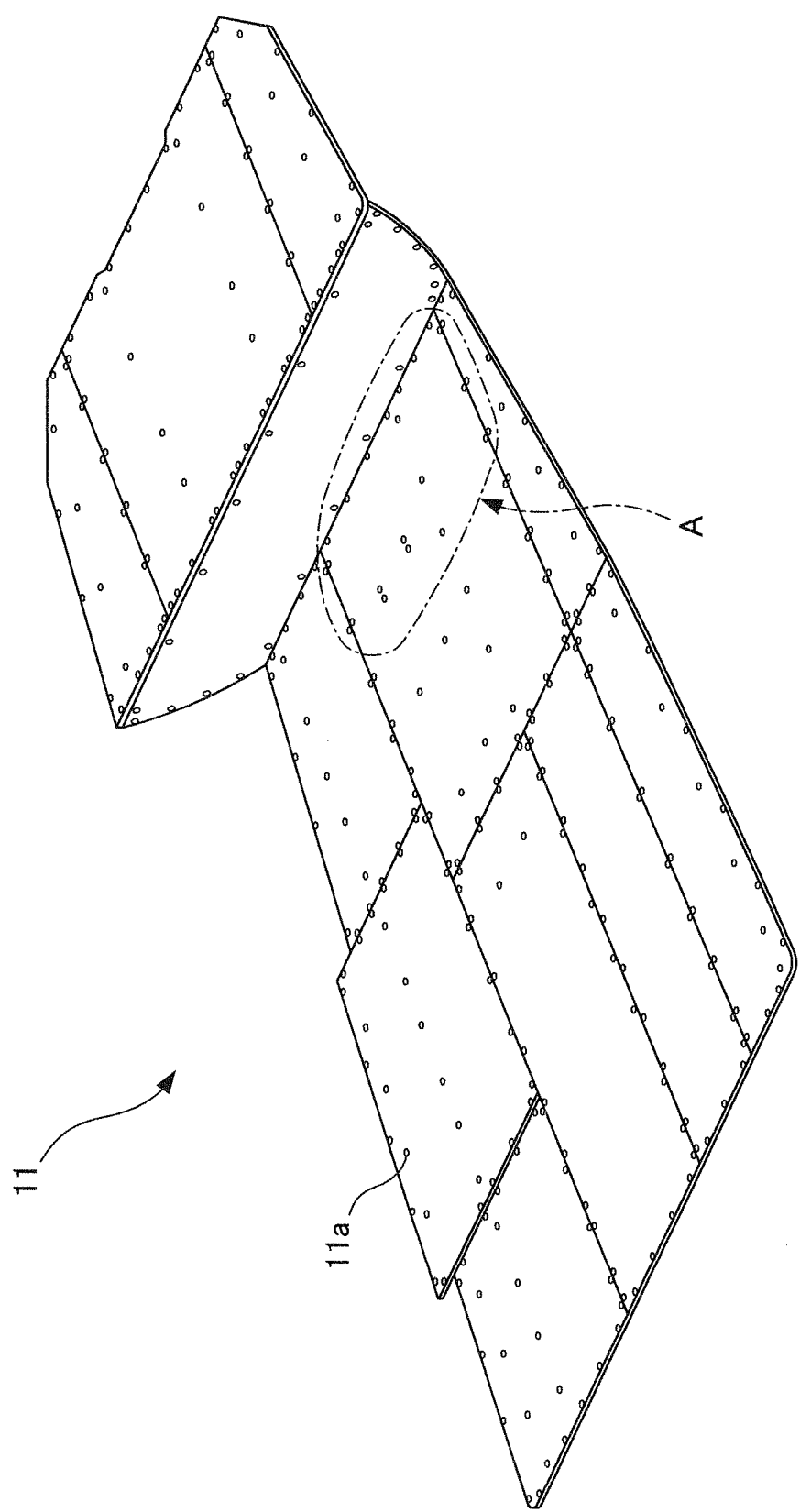

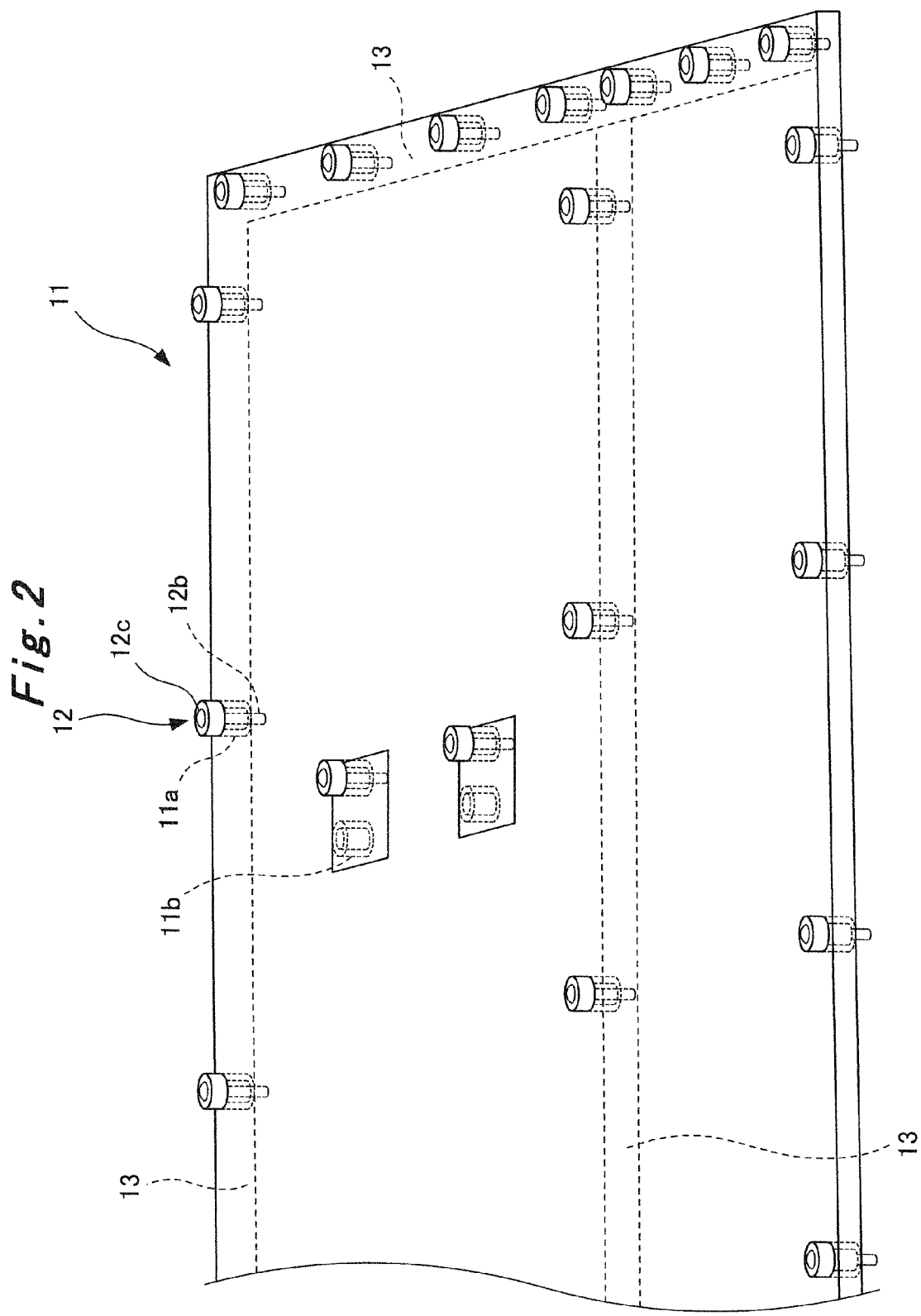

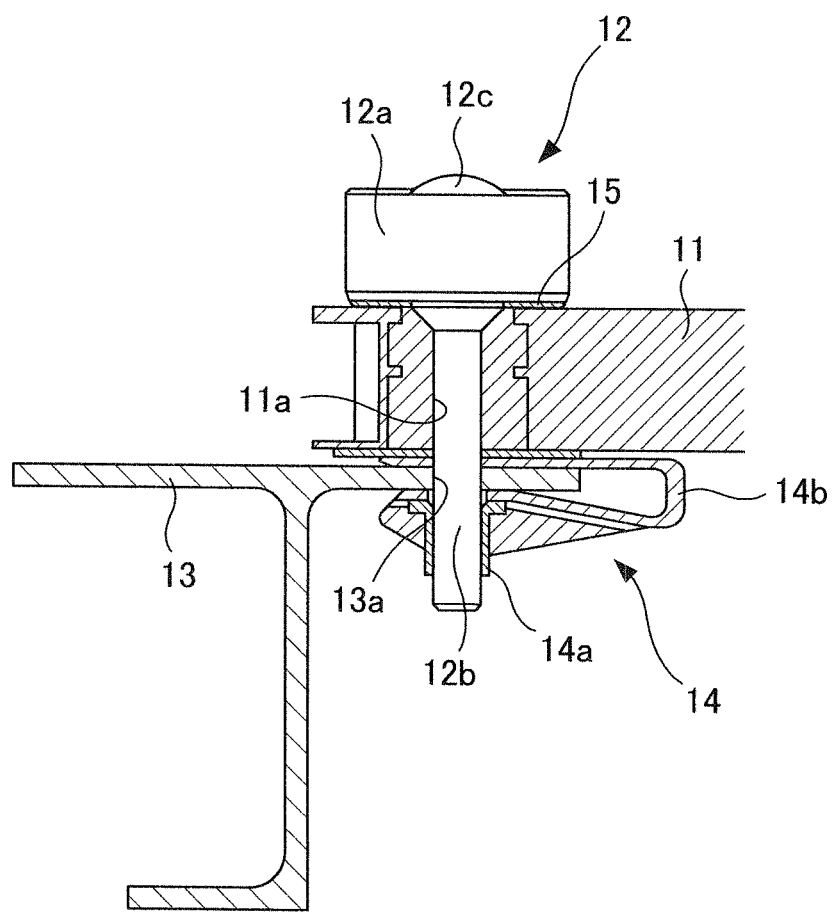

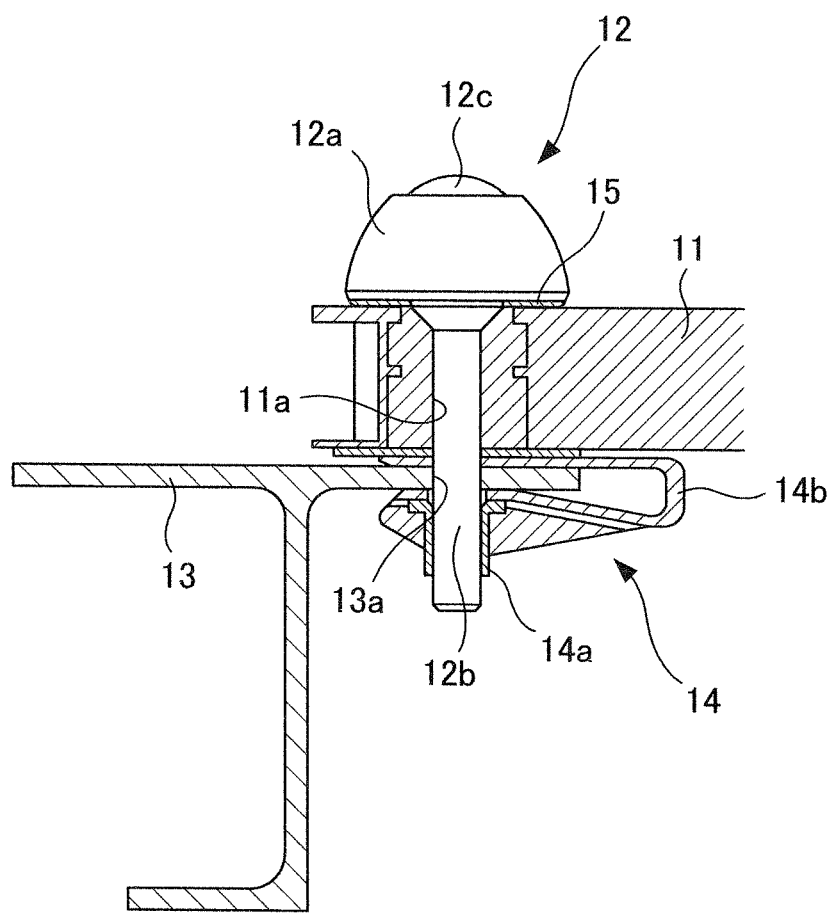

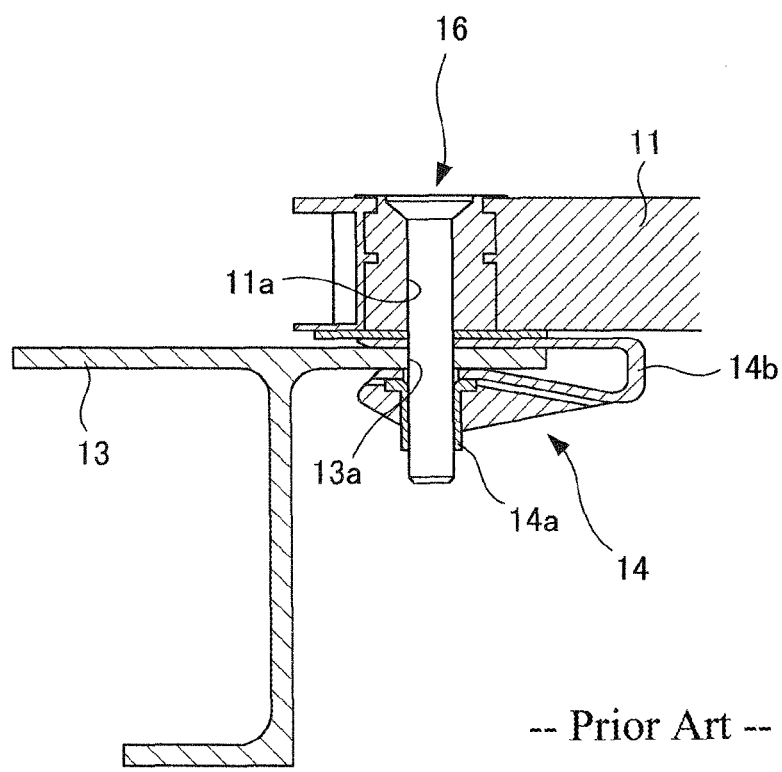

AIRCRAFT FLOOR PANEL WITH BALL TRANSFER UNIT

TECHNICAL FIELD

The present invention relates to a floor panel apparatus applied to a cargo hold of an aircraft.

BACKGROUND ART

When there is an enough space in a cargo hold of an aircraft in loading or unloading of cargo into or from the cargo hold, the loading or unloading of cargo can be performed by using a conveying machine or the like.

CITATION LIST

Patent Literature

{Patent Literature 1} US Patent Application Publication No. 2006/0065786

SUMMARY OF INVENTION

Technical Problem

However, when a cargo hold has no space for installing a machine for conveyance, a worker needs to manually load or unload cargo even if the cargo is a heavy object, and this is a great burden to the worker.

In view of this, Patent Literature 1 listed above discloses a technique using a floor panel in which multiple ball transfer units (balls and ball bearings) are disposed, to move a heavy object by means of rotation of the balls.

However, the aforementioned technique disclosed in Patent Literature 1 has the following disadvantages: disposing the ball transfer units increases the weight of the floor panel; and also a dedicated floor panel needs to be manufactured and this increases the manufacturing cost. The increases in weight and manufacturing cost are great disadvantages particularly in small aircraft which do not often carry heavy objects.

An object of the present invention is to propose a floor panel apparatus which allows for moving a heavy object in a cargo hold of an aircraft by utilizing ball transfer units and which can suppress increases in weight and manufacturing cost.

Solution to Problem

A first aspect of the present invention for solving the aforementioned problems provides a floor panel apparatus comprising:

a beam arranged inside an aircraft main body;
a floor panel arranged on the beam; and
a ball transfer unit bolt including a ball transfer unit in which a rotatable ball is disposed and a bolt portion which is integral with the ball transfer unit, the ball transfer unit bolt configured such that the floor panel and the beam are detachably fastened together by the bolt portion with the ball protruding on the floor panel side.

A second aspect of the present invention provides the floor panel apparatus in the first aspect of the present invention in which
the beam includes a plurality of beam bolt holes,
the floor panel includes floor panel bolt holes at positions corresponding to the respective beam bolt holes, and
the ball transfer unit bolt passes through each of the floor panel bolt holes and the corresponding beam bolt holes in an attachable and detachable manner to fasten the floor panel to the beam.

A third aspect of the present invention provides the floor panel apparatus in the second aspect of the present invention in which the ball transfer unit bolt is attachable to a portion of the floor panel other than the floor panel bolt holes.

A fourth aspect of the present invention provides the floor panel apparatus in the first aspect of the present invention further comprising an O-ring provided on a surface of the ball transfer unit, the surface being in contact with the floor panel.

A fifth aspect of the present invention provides the floor panel apparatus in the first aspect of the present invention in which the ball transfer unit has a side surface smoothly inclining in such a way that a diameter of the ball transfer unit decreases toward an upper side.

Advantageous Effects of Invention

The aforementioned floor panel apparatus in the first aspect of the present invention is configured to comprise: the beam arranged inside the aircraft main body; the floor panel arranged on the beam; and the ball transfer unit bolt including the ball transfer unit in which the rotatable ball is disposed and the bolt portion which is integral with the ball transfer unit, the ball transfer unit bolt configured such that the floor panel and the beam are detachably fastened together by the bolt portion with the ball protruding on the floor panel side. Hence, a heavy object can be moved by utilizing the ball transfer units. Moreover, since the ball transfer unit bolt is fastened by means of nut and bolt and is removable, the ball transfer unit bolt can be replaced by a conventional fastening bolt when the ball transfer unit bolt is unnecessary. Furthermore, since no fastener dedicated to a ball transfer unit is required, the weight of the floor panel apparatus can be reduced.

The aforementioned floor panel apparatus in the second aspect of the present invention is configured such that, in the aforementioned floor panel apparatus in the first aspect of the present invention, the beam includes the plurality of beam bolt holes, the floor panel includes the floor panel bolt holes at positions corresponding to the respective beam bolt holes, and the ball transfer unit bolt passes through each of the floor panel bolt holes and the corresponding beam bolt holes in an attachable and detachable manner to fasten the floor panel to the beam. Accordingly, it is possible to use existing bolt holes as the floor panel bolt holes and the beam bolt holes and suppress an increase in manufacturing cost.

The aforementioned floor panel apparatus in the third aspect of the present invention is configured such that, in the aforementioned floor panel apparatus in the second aspect of the present invention, the ball transfer unit bolt is attachable to a portion of the floor panel other than the floor panel bolt holes. Hence, it is possible to arrange the ball transfer units depending on the shape of a heavy object and move the heavy object more smoothly.

The aforementioned floor panel apparatus in the fourth aspect of the present invention is configured such that the aforementioned floor panel apparatus in the first aspect of the present invention further comprises the O-ring provided on the surface of the ball transfer unit, the surface being in contact with the floor panel. Hence, the ball transfer unit bolt is attachable and detachable with air tightness of the floor panel secured.

The aforementioned floor panel apparatus in the fifth aspect of the present invention is configured such that, in the floor panel apparatus in the first aspect of the present invention, the ball transfer unit has the side surface smoothly inclining in such a way that the diameter of the ball transfer unit decreases toward the upper side. Hence, a heavy object can more smoothly ride on the ball transfer unit and come into contact with the ball to be moved. Moreover, safety of the worker in the case of walking on the floor panel can be improved.

BRIEF DESCRIPTION OF DRAWINGS

FIG. 1 is a schematic view of a floor panel apparatus in Embodiment 1 of the present invention.

FIG. 2 is a partially enlarged view of the floor panel apparatus in Embodiment 1 of the present invention.

FIG. 3 is a cross-sectional view is a cross-sectional view illustrating an attachment state of a ball transfer unit bolt.

FIG. 4 is a cross-sectional view illustrating an attachment state of a ball transfer unit bolt with a different shape.

FIG. 5 is a cross-sectional view illustrating an attachment state of a conventional bolt.

DESCRIPTION OF EMBODIMENTS

An embodiment of a floor panel apparatus in the present invention is described below by using the drawings.

Embodiment 1

A configuration of a floor panel apparatus in Embodiment 1 of the present invention is described by using FIGS. 1 to 4.

A floor panel apparatus in Embodiment 1 of the present invention is formed in a cargo hold of an aircraft and includes floor panels 11, ball transfer unit bolts 12, and beams 13 as main parts.

The multiple beams 13 (see FIG. 2) are disposed in a lower portion of a fuselage of the aircraft, and the multiple floor panels 11 are disposed on the multiple beams 13 to forma floor of the cargo hold. Multiple beam bolt holes 13a are formed in each of the beams 13 to penetrate the beam 13 in a vertical direction.

FIG. 1 is a schematic view of the floor panels 11. Multiple first bolt holes 11a and multiple second bolt holes 11b are formed in the floor panels 11 as floor panel bolt holes (in FIG. 1, the second bolt holes 11b are omitted). The first bolt holes 11a are formed at positions corresponding to the respective beam bolt holes 13a. The second bolt holes 11b are formed at arbitrary positions different from the positions of the first bolt holes 11a.

FIG. 2 is a partially enlarged view of the floor panel apparatus in Embodiment 1 of the present invention. FIG. 2 corresponds to a portion denoted by A in FIG. 1.

The floor panels 11 are fixed to the beams 13 as illustrated in FIG. 2 by inserting the ball transfer unit bolts 12 into the respective beam bolt holes 13a and also into the respective first bolt holes 11a corresponding to the beam bolt holes 13a (the beam bolt holes 13a are omitted in FIG. 2).

FIG. 3 is a cross-sectional view illustrating an attachment state of each of the ball transfer unit bolts 12. The ball transfer unit bolt 12 is configured such that the floor panel 11 and the beam 13 are detachably fastened together by a bolt portion 12b with a ball 12c protruding on the floor panel 11 side.

The ball transfer unit bolt 12 includes a ball transfer unit 12a in which the rotatable ball 12c is disposed and the bolt portion 12b which is integral with the ball transfer unit 12a.

In the ball transfer unit 12a, the ball 12c and a ball bearing (not illustrated) are disposed. The ball 12c is supported by the ball bearing and is rotatable in an upper surface of the ball transfer unit 12a. The bolt portion 12b extends vertically downward (a state illustrated in FIG. 3) from a lower surface of the ball transfer unit 12a.

The bolt portion 12b passes through each of the beam bolt holes 13a and the first bolt hole 11a corresponding to this beam bolt hole 13a in the vertical direction, such that the ball transfer unit 12a (particularly, the ball 12c) protrudes from an upper surface of the floor panel 11.

A floating nut 14 includes a thread portion 14a and a fixation portion 14b. The fixation portion 14b is configured to be capable of holding a width-direction end portion of the beam 13 from both sides thereof in the vertical direction. Bolt holes are formed in a portion of the floating nut 14 facing an upper surface of the beam 13 (a portion between the upper surface of the beam 13 and a lower surface of the floor panel 11) and in a portion of the floating nut 14 facing a lower surface of the beam 13 such that the bolt portion 12b of the ball transfer unit bolt 12 can be inserted into the bolt holes.

The thread portion 14a of the floating nut 14 is a nut portion, and the ball transfer unit bolt 12 which is inserted through the first bolt hole 11a of the floor panel 11, the bolt holes of the fixation portion 14b, and the beam bolt hole 13a of the beam 13 is screwed to the thread portion 14a.

Fastening the bolt portion 12b of the ball transfer unit bolt 12 to the thread portion 14a achieves a state where the floor panel 11 is fixed to the beam 13 and the ball transfer unit bolt 12 itself is also fixed to the floor panel 11 and the beam 13.

The ball transfer unit bolt 12 can be attached and detached by being fastened to or removed from the floating nut 14.

Moreover, the ball transfer unit bolt 12 is attachably and detachably provided also for each of the second bolt holes 11b, in the same way as for the first bolt holes 11a. The ball transfer unit bolts 12 can be thereby attached to portions other than the floor panel bolt holes 11a of the floor panel 11. In this case, nuts are provided directly on a lower surface of the floor panel 11.

Furthermore, each of the ball transfer unit bolts 12 may include an O-ring on the lower surface of the ball transfer unit 12a, on an outer periphery of a base of the bolt portion 12b. Air tightness between spaces above and below the floor panel 11 can be thereby secured.

The configuration of the floor panel apparatus in Embodiment 1 of the present invention has been described above. Next, operations of the floor panel apparatus in Embodiment 1 of the present invention is described.

When the floor panel apparatus in Embodiment 1 of the present invention is used in a cargo hold, a lower surface of a heavy object comes into contact with the balls 12c in the upper surfaces of the ball transfer units 12a in loading of the heavy object onto the floor panels 11. Accordingly, a worker can move and load the heavy object by using rotation of the balls 12c. Hence, the worker does not have to carry the heavy object in the loading thereof onto the floor panels 11, and a burden on the worker can be reduced.

Moreover, the first bolt holes 11a and the beam bolt holes 13a to which the ball transfer unit bolts 12 are screwed are originally provided to screw (conventional) bolts used only for the purpose of fixing the floor panels 11 to the beams 13. In other words, since the floor panel apparatus in Embodiment 1 of the present invention utilizes the first bolt holes 11a and the beam bolt holes 13a which are originally provided, the cost of manufacturing the floor panel apparatus can be suppressed. Furthermore, since the ball transfer unit bolts 12 are used instead of the conventional bolts to fasten the floor panels to the beams, an increase in weight is smaller compared to the case where an additional ball conveying device (see Patent Literature 1 described above) is provided or the case where fixtures dedicated to ball transfer units are used.

Moreover, the floor panels of the cargo hold need to be air tight so that, if a fire occurs in the cargo hold, flame and smoke do not flow out from the cargo hold into a passenger cabin through a space below the floor panels of the cargo hold. The air tightness is generally achieved by applying a liquid sealing material to the bolts. However, when the liquid sealing material is used, the bolts cannot be easily removed once they are fixed. In the embodiment, the O-rings 15 are used instead of the conventional liquid sealing material for the ball transfer unit bolts 12. Accordingly, it is possible not only to secure the air tightness of the floor panels 11 but also to attach and detach the ball transfer unit bolts 12. Hence, as illustrated in the cross-sectional view of FIG. 5 which illustrates an attachment state of a conventional bolt 16, the ball transfer unit bolts 12 can be replaced by the conventional bolts 16 and vise versa.

In this way, it is possible to attach the ball transfer unit bolts 12 in the case of loading a heavy object and attach the bolts 16 in other cases. An increase in weight can be thereby suppressed, because the ball transfer unit bolts 12 which are heavier than the conventional bolts 16 only by the weight of the ball transfer units are used.

Moreover, the second bolt holes 11b can be provided at arbitrary positions. Accordingly, the second bolt holes 11b are provided at positions appropriate for smooth moving of a heavy object. Note that, since there is no need to attach the conventional bolts 16 to the second bolt holes 11b when no ball transfer unit bolts 12 are used, the second bolt holes 11b may be sealed by using sealing lids (not illustrated) or the like.

Moreover, some of the multiple conventional bolts 16 may be replaced by the ball transfer unit bolts 12 depending on the situation. In other words, the other bolts 16 may be left as they are in the case of loading a heavy object. This can reduce the man-hour required for the replacing work.

Note that, as is apparent from comparison of FIGS. 3 and 5, the ball transfer unit 12a of the ball transfer unit bolt 12 protrudes from the upper surface of the floor panel 11, while the conventional bolt 16 is buried in the floor panel 11. Accordingly, in the case where both of the ball transfer unit bolts 12 and the conventional bolts 16 are disposed, a heavy object is not caught by the conventional bolts 16 while being moved.

Moreover, as illustrated in FIG. 4, the ball transfer unit 12a may have a side surface smoothly inclining in such away that the diameter of the ball transfer unit 12a becomes smaller toward the upper surface (upward) where the ball 12c is disposed. A heavy object can thereby more smoothly ride on the ball transfer unit 12a and come into contact with the ball 12c to be moved. Furthermore, safety of the worker in the case of walking on the floor panels 11 can be improved.

INDUSTRIAL APPLICATION

The present invention is preferable as a floor panel apparatus of a cargo hold provided in an aircraft.

REFERENCE SIGNS LIST

11 FLOOR PANEL (OF CARGO HOLD)
11 a FIRST BOLT HOLE
11 b SECOND BOLT HOLE
12 BALL TRANSFER UNIT BOLT
12 a BALL TRANSFER UNIT
12 b BOLT PORTION
12 c BALL
13 BEAM
13 a BEAM BOLT HOLE
14 FLOATING NUT
14 a THREAD PORTION
14 b FIXATION PORTION
15 O-RING
16 BOLT.

The invention claimed is:

1. A floor panel apparatus comprising:
a beam arranged inside an aircraft main body;
a floor panel arranged on the beam; and
a ball transfer unit bolt including:
    a ball transfer unit in which a rotatable ball is disposed, and
    a bolt portion which is integral with the ball transfer unit,
the ball transfer unit bolt configured such that the bolt portion penetrates the floor panel and the beam with the ball protruding on the floor panel side.

2. The floor panel apparatus according to claim 1, wherein
the beam includes a plurality of beam bolt holes,
the floor panel includes floor panel bolt holes at positions corresponding to the respective beam bolt holes, and
the ball transfer unit bolt passes through each of the floor panel bolt holes and the corresponding beam bolt holes in an attachable and detachable manner.

3. The floor panel apparatus according to claim 1, wherein
the beam includes a plurality of beam bolt holes,
the floor panel includes first bolt holes at positions corresponding to the respective beam bolt holes,
the floor panel includes second bolt holes at positions different from the positions of the first bolt holes,
the ball transfer unit bolt is attachable to each of the first bolt holes and second bolt holes.

4. The floor panel apparatus according to claim 1, further comprising an O-ring provided on a surface of the ball transfer unit, the surface being in contact with the floor panel.

5. The floor panel apparatus according to claim 1, wherein the ball transfer unit has a side surface smoothly inclining in such a way that a diameter of the ball transfer unit decreases toward an upper side.

* * * * *